United States Patent
Etemad et al.

(10) Patent No.: US 9,578,616 B2
(45) Date of Patent: Feb. 21, 2017

(54) FORMING CARRIER AGGREGATION TIMING ADVANCE GROUPS IN A HETEROGENEOUS NETWORK

(75) Inventors: Kamran Etemad, Potomac, MD (US); Mo-Han Fong, Sunnyvale, CA (US); Jong-Kae Fwu, Sunnyvale, CA (US); Huaning Niu, Milpitas, CA (US)

(73) Assignee: Intel Corporation, Santa Clara, UT (US)

(*) Notice: Subject to any disclaimer, the term of this patent is extended or adjusted under 35 U.S.C. 154(b) by 0 days.

(21) Appl. No.: 13/994,111

(22) PCT Filed: Dec. 20, 2011

(86) PCT No.: PCT/US2011/066212
§ 371 (c)(1),
(2), (4) Date: Apr. 14, 2014

(87) PCT Pub. No.: WO2013/025237
PCT Pub. Date: Feb. 21, 2013

(65) Prior Publication Data
US 2014/0219185 A1 Aug. 7, 2014

Related U.S. Application Data

(60) Provisional application No. 61/523,080, filed on Aug. 12, 2011.

(51) Int. Cl.
*H04W 4/00* (2009.01)
*H04W 56/00* (2009.01)
(Continued)

(52) U.S. Cl.
CPC ........... *H04W 56/0045* (2013.01); *H04B 3/36* (2013.01); *H04B 7/0413* (2013.01);
(Continued)

(58) Field of Classification Search
CPC ....................................................... H04L 47/10
See application file for complete search history.

(56) References Cited

U.S. PATENT DOCUMENTS 8,036,702 B2   10/2011   Etemad
8,565,180 B2*  10/2013   Ng ................................ 370/329
(Continued)

FOREIGN PATENT DOCUMENTS

KR     10-0770145 B1     10/2007
WO     WO 2011/005011     1/2011
(Continued)

OTHER PUBLICATIONS

International application No. PCT/US2011/065838, filed on Dec. 19, 2011, 22 pages.
(Continued)

*Primary Examiner* — Afshawn Towfighi
(74) *Attorney, Agent, or Firm* — Thorpe North & Western

(57) ABSTRACT

Technology for forming carrier aggregation timing advance groups in a heterogeneous network (HetNet) is disclosed. One method comprises assigning at least a first component carrier cell to one of a first timing advance group and a second timing advance group. At least a second component carrier cell is assigned to one of the first timing advance group and the second timing advance group. A separate timing advance index value is selected for each of the first and second timing advance groups. The timing advance index value is used to refer to the timing advance group in signaling in the HetNet.

22 Claims, 8 Drawing Sheets

(51) Int. Cl.
  *H04W 52/34* (2009.01)
  *H04L 5/00* (2006.01)
  *H04W 24/02* (2009.01)
  *H04L 1/00* (2006.01)
  *H04B 3/36* (2006.01)
  *H04B 7/04* (2006.01)
  *H04L 1/18* (2006.01)
  *H04W 76/04* (2009.01)
  *H04W 52/14* (2009.01)
  *H04W 52/24* (2009.01)

(52) U.S. Cl.
  CPC .......... *H04L 1/0003* (2013.01); *H04L 1/0026* (2013.01); *H04L 1/1812* (2013.01); *H04L 5/001* (2013.01); *H04L 5/0032* (2013.01); *H04L 5/0057* (2013.01); *H04L 5/0073* (2013.01); *H04L 5/0091* (2013.01); *H04W 24/02* (2013.01); *H04W 52/34* (2013.01); *H04W 76/046* (2013.01); *H04W 52/146* (2013.01); *H04W 52/241* (2013.01)

(56) References Cited

U.S. PATENT DOCUMENTS

| | | |
|---|---|---|
| 2011/0021197 A1 | 1/2011 | Ngai |
| 2011/0110256 A1 | 5/2011 | Han et al. |
| 2011/0261704 A1 | 10/2011 | Etemad |
| 2011/0261763 A1 | 10/2011 | Chun |
| 2011/0267978 A1 | 11/2011 | Etemad |
| 2012/0113939 A1 | 5/2012 | Kim et al. |
| 2012/0257601 A1* | 10/2012 | Kim ................ H04L 5/001 370/336 |
| 2013/0034085 A1* | 2/2013 | Bostrom et al. ............. 370/336 |
| 2014/0105192 A1 | 4/2014 | Park |

FOREIGN PATENT DOCUMENTS

| | | |
|---|---|---|
| WO | WO 2011/085200 | 7/2011 |
| WO | 2012/054465 A2 | 4/2012 |
| WO | WO 2012/087982 | 6/2012 |
| WO | 2013/025237 A1 | 2/2013 |
| WO | WO 2013/022472 | 2/2013 |

OTHER PUBLICATIONS

International Search Report and Written Opinion received for PCT application No. PCT/US2011/066212, mailed on Apr. 10, 2012, 9 pages.

International Preliminary Report on Patentability with Written Opinion received for PCT Patent Application No. PCT/US2011/066212, mailed on Feb. 27, 2014, 6 pages.

3GPP TS 36.321; "Technical Specification Group Radio Access Network; Evolved Universal Terrestrial Radio Access(E-UTRA); Medium Access Control (MAC) protocol specification"; Release 10,vol. 10.2.0, Jun. 2011, 54pgs; Organizational Partners, Valbonne, France.

3GPP TS 36.300; "Technical Specification Group Radio Access Network; Evolved Univeral Radio Access (E-UTRA) and Evolved Univeral Terrestrial Radio Access Netork (E-UTRAN); Overall description; Stage 2"; Release 10, vol. 10.0.0, Jun. 2010,183pgs; Organizational Partners, Valbonne, France.

ETSI MCC, "Draft Report of 3GPP TSG RAN WG2 meeting #74, Barcelona, Spain, May 9-13, 2011", TSG-RAN Working Group 2 R2-113701, Aug. 2011, 175 pages, Meeting 75, Agenda 2.2, Athens, Greece.

Intel Corporation, "Configuration of multiple TA in Rel-11 CA", 3GPP TSG-RAN2 R2-112138, Apr. 2011, 6 pages, Meeting 73bis, Agenda 7.1, Shanghai, China.

Intel Corporation, "On open Issues on Multiple Timing Advance in Rel-11 CA", 3GPP TSG-RAN2 R2-114249, Aug. 2011, 5 pages, Meeting 75, Agenda 7.1.1.1, 7.1.1.2, 7.1.1.3, Athens, Greece.

Itri, "Considerations on TAT for Multiple TAs", 3GPP TSG-RAN WG2 R2-113193, May 2011, 5 pages, Meeting 74, Agenda 7.1.1, Barcelona, Spain.

Nokia Siemens Network et al, "Multiple Timing Advance", 3GPP TSG-RAN WG2 R2-111897, Apr. 2011, 4 pages, Meeting 73bis, Agenda 7.1, Shanghai, China.

Renesas Mobile Europe, "Multiple timing advance using multiple RACH", 3GPP TSG-RAN WG2 R2-113014, May 2011, 3 pages, Meeting 74, Agenda 7.1.1, Barcelona, Spain.

Samsung, "Main issues in supporting multi-TAs", 3GPP TSG-RAN WG2 R2-112305, Apr. 2011, 2 pages, Meeting 73bis, Agenda 7.1, Shanghai, China.

* cited by examiner

FORMING CARRIER AGGREGATION TIMING ADVANCE GROUPS IN A HETEROGENEOUS NETWORK

CLAIM OF PRIORITY

Priority of U.S. Provisional patent application Ser. No. 61/523,080 filed on Aug. 12, 2011 is claimed, and is hereby incorporated by reference.

BACKGROUND

As the use of mobile wireless devices, such as smart phones and tablet devices, becomes more ubiquitous, the demands on the limited amount of radio frequency spectrum used by those devices also increases, resulting in wireless network congestion in the licensed spectrum. In addition, the increased use of high bandwidth applications such as audio and video streaming can increase demands beyond the capability of the available spectrum. This is especially true in high density and high use locations such as large cities and universities. One projection estimates a growth of 20 times in mobile internet traffic from 2010 to 2015.

One way of increasing bandwidth in wireless devices is through the use of heterogeneous wireless networks (HetNet), in which multiple nodes are co-located to provide increased data throughput to mobile devices communicating with one or more nodes within a cell. A cell is typically defined as the geographic area over which a macro base station, such as an enhanced Node B (eNode B) is configured to communicate with a mobile device. A macro base station can be one node located within the cell. Additional low power nodes can also be located in a cell.

A cell is often depicted as a circular area with a predefined radius. However, the actual shape of radiation patterns for antennas in a base station can differ from the predefined radius. Moreover, the use of beam forming and/or Multiple-Input Multiple-Output (MIMO) systems enables a cell to communicate at distances greater than a typical predefined radius in certain instances. The actual radiation pattern of a base station antenna can result in areas within the cell that have relatively low signal strength which can result in slow data connections and dropped phone calls.

Low power nodes in the HetNet can be used to provide access to mobile devices located in areas having low signal strength. In addition, low power nodes can also be used to increase the density of mobile device communication in a defined area.

However, transmitting and receiving over different paths can create a number of challenges. For example, signals communicated from mobile devices may travel different paths between the wireless device and the nodes located within a cell. The distinct propagation paths between different carriers can create timing differences in the reception of the signals. This can be disadvantageous in wireless systems that combine data for multiple devices in a single signal, such as in systems that use Orthogonal Frequency Division Multiple Access (OFDMA).

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1A:
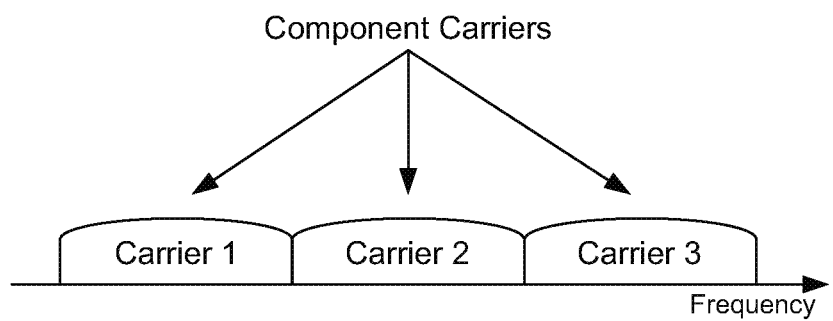
FIG. 1a is a block diagram illustrating multiple contiguous component carriers in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

DEFINITIONS

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

An exponential increase in the amount of wireless data transmission has created congestion in wireless networks using licensed spectrum to provide wireless communication services for wireless devices such as smart phones and tablet devices, to name a few. The congestion is especially apparent in high density and high use locations such as urban locations and universities.

One technique for providing additional bandwidth capacity to wireless devices is through the use of heterogeneous networks comprised of multiple communication nodes located within a cell. A communication node, as used herein, is defined as a base station configured to provide wireless communication for one or more wireless devices located within a cell. A base station may be a macro node designed to provide wireless communication for devices over a relatively large area or a low power node designed to provide wireless communication over a smaller defined area relative to the macro node.

As previously discussed, a cell is defined as a selected geographic area over which a macro base station, such as an enhanced Node B (eNode B) is configured to communicate with a mobile device. A macro base station can be one communication node located within the cell. The macro base station may be configured to operate based on the third generation partnership project long term evolution (3GPP LTE) standard, including Release 8, Release 9, and Release 10. The 3GPP LTE base station is typically referred to as an enhanced Node B (eNode B). The macro base station may also be configured to operate based on other standards, such as the Worldwide Interoperability for Microwave Access (WiMAX) based on the Institute of Electronics and Electrical Engineers (IEEE) 802.16e 2005 standard and the IEEE 802.16m 2009 standard.

Low power nodes can also be located in the cell to provide coverage in areas where the macro node does not provide a desired signal strength level for wireless communication. In addition, the low power nodes can be used to provide connections for additional mobile devices in high density areas of the cell. Low power nodes are defined as a wireless base station having less output power than the macro node. Low power nodes can include micro nodes, pico nodes, femto nodes, home eNode Bs (HeNode B), remote radio heads (RRH), remote radio units (RRU), repeaters, frequency selective repeaters, and the like.

Another way of increasing bandwidth in a cell is through the use of carrier aggregation. Carrier aggregation enables multiple carrier signals to be simultaneously communicated between a user's wireless device and a base station. Multiple different carriers can be used. In some instances, the carriers may be from different permitted frequency domains. This provides a broader choice to the wireless devices, enabling more bandwidth to be obtained. The greater bandwidth can be used to communicate bandwidth intensive operations, such as streaming video or communicating large data files.

FIG. 1a illustrates an example of carrier aggregation of continuous carriers. In the example, three carriers are contiguously located along a frequency band. Each carrier can be referred to as a component carrier. In a continuous type of system, the component carriers are located adjacent one another and are typically located within a single frequency band. A frequency band is a selected frequency range in the electromagnetic spectrum. Selected frequency bands are designated for use with wireless communications such as wireless telephony. Certain frequency bands are owned or leased by a wireless service provider. Each adjacent component carrier may have the same bandwidth, or different bandwidths. A bandwidth is a selected portion of the frequency band. Wireless telephony has traditionally been conducted within a single frequency band.

Figure 1B:
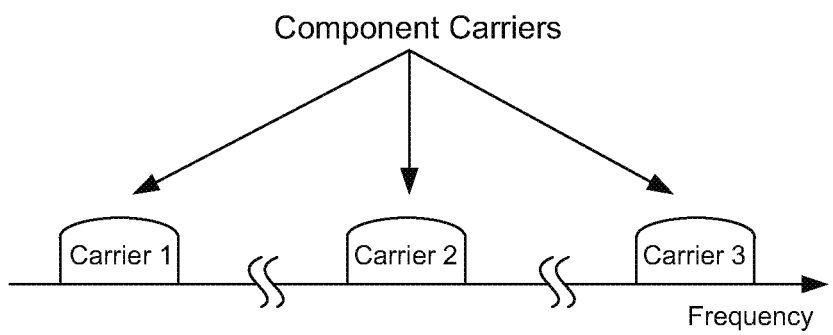
FIG. 1b is a block diagram illustrating multiple non-contiguous component carriers in accordance with an example.

FIG. 1b illustrates an example of carrier aggregation of non-continuous component carriers. The non-continuous component carriers may be separated along the frequency range. Each component carrier may even be located in different frequency bands. The ability to use component carriers in different frequency bands enables more efficient use of available bandwidth and increases the aggregated data throughput.

At a wireless device, such as a User Equipment (UE), the device can be configured to communicate with a base station (eNodeB) via a selected carrier. This selected carrier can be designated as a first component carrier. Each component carrier at the UE can appear as a serving cell at the UE, as defined by the Third Generation Partnership Project (3GPP) Long Term Evolution (LTE) Release 8 specification. The serving cell associated with the component carrier that is configured with the full control channels/signals by the eNodeB to the UE can be referred to as a Primary Serving Cell (PCell). The primary cell is typically the first component carrier set up for a UE. However, any component carrier can be designated as the PCell. If additional component carriers are needed at the UE to provide a desired bandwidth, quality of service, or other desired feature, additional component carriers can be assigned to the UE by the eNodeB via the radio resource control (RRC) signaling. Each additional component carrier can be configured and associated with a Secondary Serving Cell (SCell) at the UE. In one embodiment, the secondary serving cell can have no physical uplink control channel (PUCCH) transmission to the UE based on the current LTE Rel-8/9/10 specifications. It should be noted that the terms "PCell and SCell" are different from the generic "cell" that was previously defined. The PCell and SCell do not refer to a geographic area over which a node can communicate. Rather, a PCell and SCell represent a communication link formed between a mobile device such as a UE and a node such as a macro node or a low power node.

When a UE is turned on, or activated, the distance between the UE and the eNodeB causes a propagation delay in the signal. To account for the propagation delay, the transmit timing at the UE can be adjusted. This is typically accomplished by transmitting a signal from the UE to the eNodeB and receiving a response from the eNodeB that instructs the UE how much the transmit timing at the UE needs to be adjusted (forwards or backwards) based on how closely the signal from the UE correlates with a timing advance signal at the eNodeB.

In the 3GPP LTE specification Releases 8, 9, and 10 designate that the signal transmitted from the UE includes a random access preamble. The random access preamble can be assigned at the Medium Access Control (MAC) layer in the uplink and communicated on a Random Access Channel (RACH) such as the Physical Random Access Channel (PRACH). This signal transmitted by the UE is received at the eNode B and correlated with a timing reference signal. A determination is made by the eNodeB how much the timing advance of the transmission of the carrier signal at the UE will need to be adjusted. The timing advance may be adjusted in a positive or negative direction.

The eNodeB can then send a Random Access Response (RAR). The LTE specification indicates that the RAR should includes an initial 11-bit timing advance, as defined in Section 6.2.3 of TS 36.321 v.10.2. The UE can then adjust the timing of its transmissions based on the number received (between 0 and 1024). The UE timing is to be adjusted with a relative accuracy better than or equal to +/−4Ts, where Ts=1/(15,000*2048) seconds. The change in transmission timing at the UE is referred to as a timing advance (TA) adjustment. After the initial synchronization from the RACH, the eNodeB can use other uplink signals such as the cyclic prefix or the uplink reference signal for synchronization tracking and/or updating.

Currently, in the 3GPP LTE Release 10 specification, only one timing advance value is supported with the following two restrictions for the UE configured with the carrier aggregations: (1) the timing advance is based on synchronization to the PCell; and (2) no RACH procedure is allowed on the SCell.

The use of multiple nodes in a HetNet or multiple carrier components of different frequency bands can add additional complications in setting up a downlink and uplink connection between a wireless device and an eNode B or other type of communication node. In 3GPP LTE Releases 8, 9, and 10, when a UE is turned on and configured with the carrier aggregations, the initial random access for uplink carrier aggregation is initiated from the uplink PCell only. Both the uplink PCell and SCell(s) share the same single timing advance (TA), which is maintained on the PCell. Therefore, only one single timing advance in the uplink is supported, even when multiple component carriers in the same band or different frequency bands are aggregated.

Figure 2:
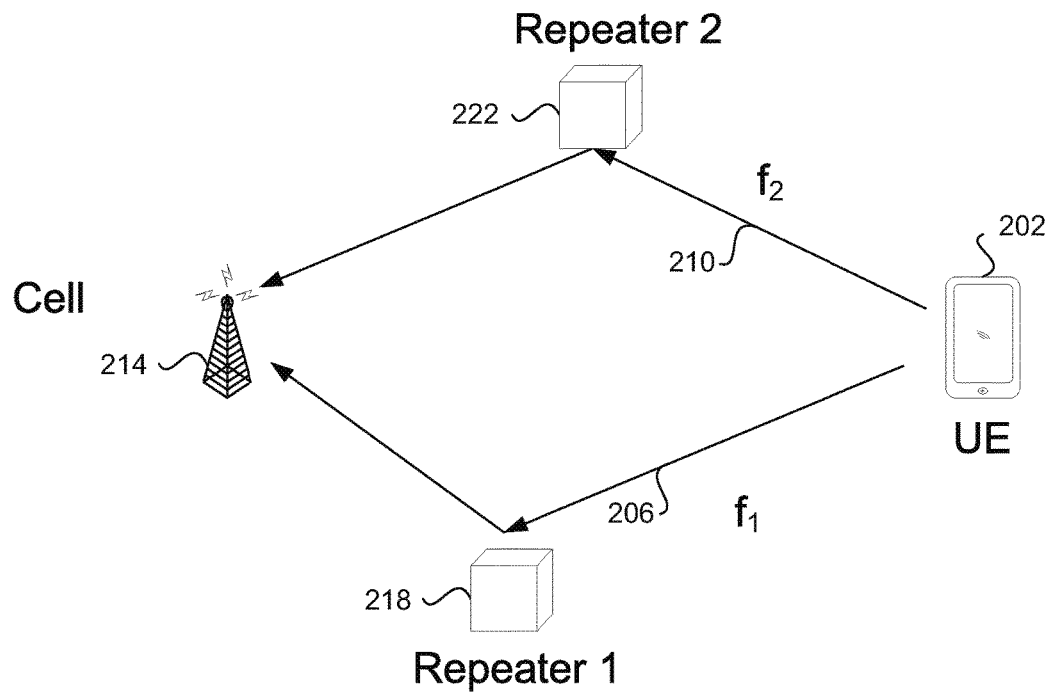
FIG. 2 is a block diagram illustrating a communication system using frequency selective repeaters in accordance with an example.
Figure 3:
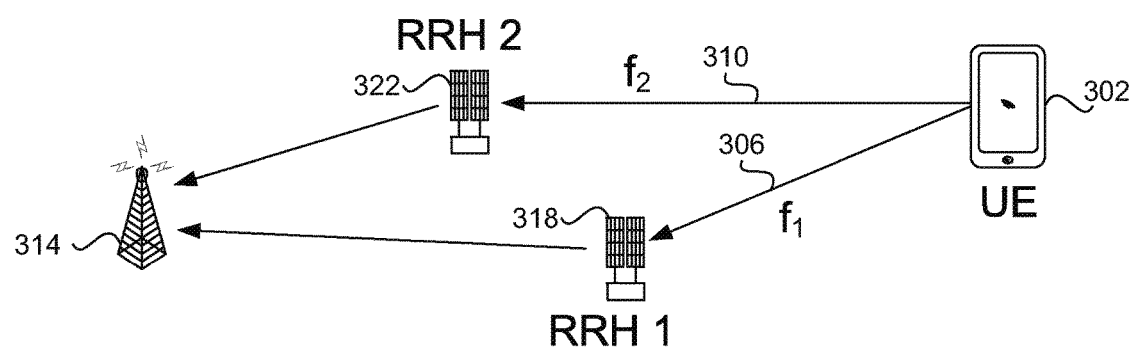
FIG. 3 is a block diagram illustrating a communication system using frequency selective remote radio heads in accordance with an example.
Figure 4:
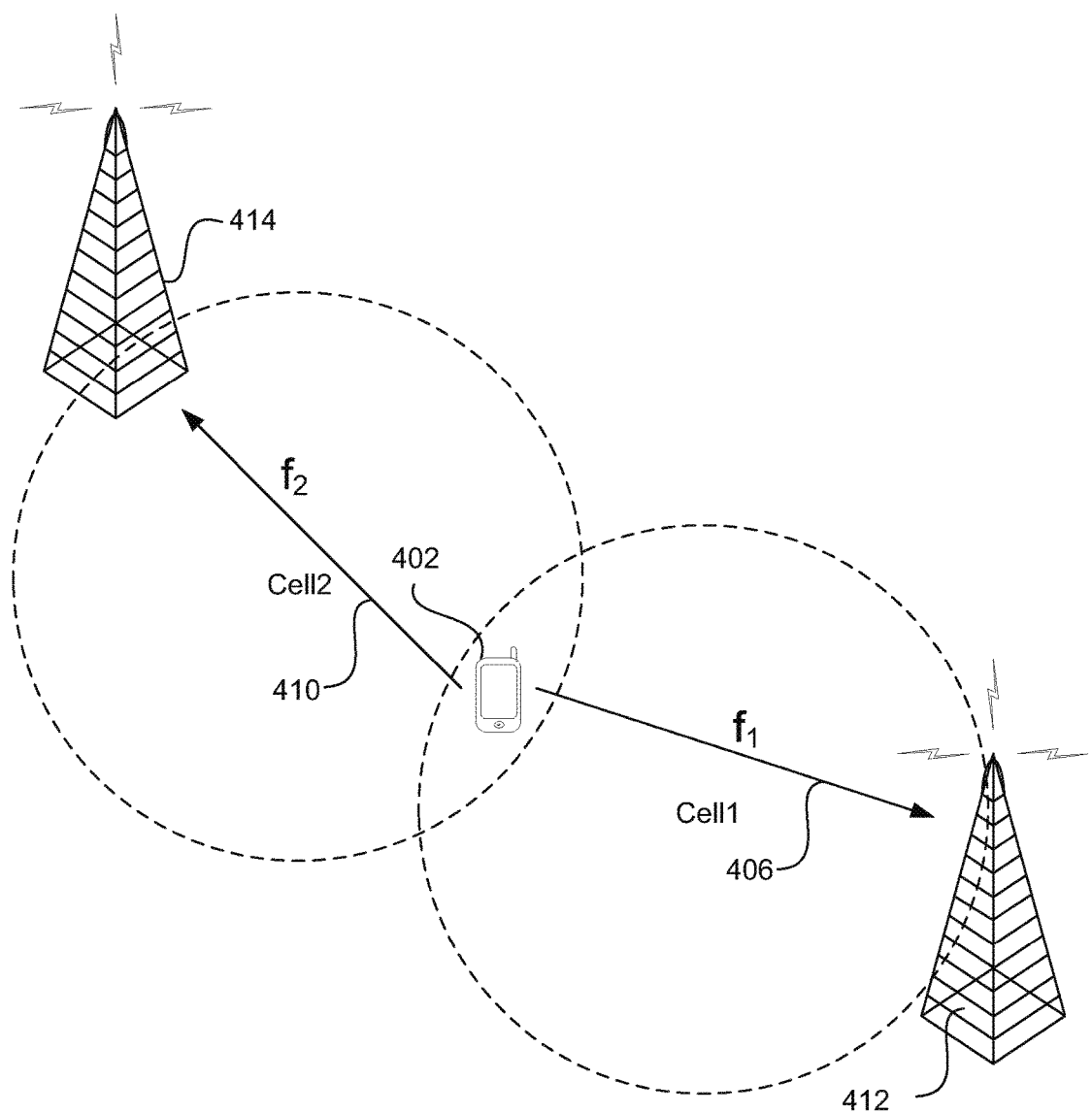
FIG. 4 is a block diagram illustrating a communication system using multiple Coordinated Multipoint (CoMP) base stations in accordance with an example.

There are several scenarios where separate timing advance adjustments per component carrier may be used to significantly increase the efficiency of carrier aggregation using multiple component carriers. Three different scenarios are illustrated in FIGS. 2-4 that may cause different component carriers to travel significantly different propagation paths and cause different propagation delays. The reception and decoding of information carried by the component carriers can be significantly enhanced with the use of a timing advance adjustment for one or more SCells.

FIG. 2 provides an example illustration in which a UE 202 is configured with a PCell associated with a first component carrier signal 206 transmitted at a first frequency $f_1$. An SCell is associated with a second component carrier signal 210 transmitted at a second frequency $f_2$. The first component carrier signal may be relayed to the eNodeB 214 by a first frequency selective repeater 218. The second component carrier signal may be relayed to the eNodeB by a second frequency selective repeater 222. Each repeater 218, 222 may be positioned a different distance from the eNodeB 214. Depending on the location of the UE relative to each repeater and the distance of each repeater relative to the eNodeB, the distance traveled by the first component carrier signal 206 may be substantially different than the distance traveled by the second component carrier signal 210. If the arrival timing of the component carrier signals at the eNodeB is greater than $4f_s$, then the timing is not within the 3GPP LTE specification standard. Thus, there may be a need to perform a timing advance adjustment for each component carrier.

Similarly, FIG. 3 provides an example in which a UE 302 transmits a first component carrier signal 306 having a first frequency $f_1$ and a second component carrier signal 310 having a second frequency $f_2$. The first component carrier may be received by a first frequency selective remote radio head (RRH) 318 for initial baseband processing and then communicated to a base band unit (BBU) or eNodeB 314 for additional processing and communication to a network. The second component carrier may be received by a second remote radio head 322 and communicated to the BBU/eNodeB 314. As in FIG. 2, the position of the UE relative to each RRH, and the position of each RRH relative to the eNodeB 314 can change the path length of each component carrier signal and create a potential need for individual timing adjustment for each component carrier.

FIG. 4 provides an additional example, wherein a UE 402 is configured to communicate with a first eNodeB 410 and a second eNodeB 412 using Coordinated Multipoint (CoMP) communication. The first and second eNodeBs can be connected by a high speed optical fiber to enable communications between the eNodeBs to be coordinated. In this example, the UE 402 communicates via a first component carrier signal 406 having a first frequency $f_1$ and a second component carrier signal 410 having a second frequency $f_2$. The first component carrier can be received by eNodeB 412 and the second component carrier can be received by eNodeB 414. In the context of uplink CoMP, different cells can receive the UE's signals on any component carrier. The timing advance could therefore be chosen to target any of the cells. Thus, different carriers could have different timing advance commands. As in FIGS. 2 and 3, the position of the UE relative to each eNodeB can change the path length of each component carrier and create a potential need for individual timing adjustment for each component carrier.

Figure 5A:
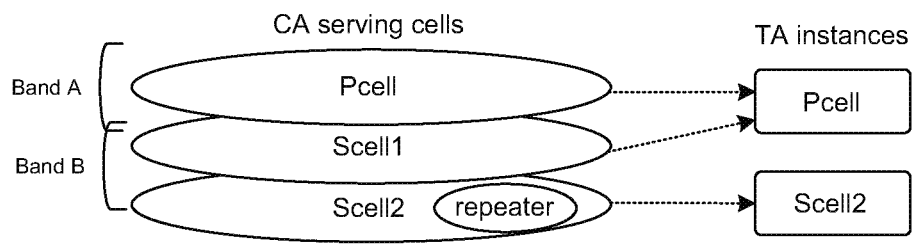
FIGS. 5a and 5b are block diagrams illustrating carrier aggregation serving cells assigned to timing advance groups in accordance with two examples.

FIG. 5a provides an example illustration of carrier aggregation (CA) serving cells. Each CA serving cell represents a connection between the UE and one or more nodes within a cell, such as a macro node and a low power node. As previously discussed, the primary cell is typically the first component carrier set up for a UE. The PCell can be designated to carry the PUCCH for PCell communications and SCell communications.

FIG. 5a also shows two SCells, designated SCell 1 and SCell 2. The PCell may comprise a communication between a UE and a first eNode B. SCell 1 may comprise a communication with a second eNode B or a low power node and the UE, with the second eNode B (or low power node) collocated at the same site as the first eNode B. SCell 2 may comprise a communication with the UE and one or more frequency selective repeaters located at a different location than the first and second eNode Bs. The frequency selective repeaters may be positioned in locations within the cell that receive a low power from the eNode B or that have a high volume of wireless communication.

Since the timing advance value will be substantially similar for the PCell and SCell 1, due to the collocation of the nodes, the serving cells can be combined in a timing advance group (TA group) for which a timing advance instance is assigned. In one embodiment, the timing advance instance may be referred to as the PCell instance. The separate location of the low power node in the serving cell for SCell 2 may require a separate timing advance for the low power node in order for carrier aggregation to be accomplished at the UE. Accordingly, SCell 2 can be placed in a different TA group with a different timing advance instance that is referred to in FIG. 5a as the SCell 2 timing advance instance.

In one embodiment, for a TA group that includes the PCell, the reference node can be the node associated with the PCell. For a TA group that does not include the PCell, the reference cell for the timing advance instance may be designated by the eNode B. Alternatively, the reference cell for the timing advance instance can be any active SCell in the TA group, as determined by the UE.

When multiple TA groups exist in a cell, an identification means is needed to uniquely identify each TA group. The unique identification can be used to identify a TA group in cell configurations and in the TA command media access control (MAC) control element (CE). A variety of different ways exist to refer to and maintain signaling with different TA groups. For example, a cell's cell index (CI) of one of the carrier components in the TA group may be used to identify the TA group. The carrier index is already defined in the 3GPP LTE Release 10. Whenever a new carrier component is added to or removed from a TA group, the reference cell index for the TA group can be updated. In one embodiment, an implicit rule may be used, such as using the node in the serving cell in the TA group with the smallest cell index value as the reference cell for the TA value. However, it is possible that some ambiguity may arise which could lead to a mismatch between an eNode B and the UE during radio resource control (RRC) configuration when an SCell is added to or removed from a configured TA group.

Figure 5B:
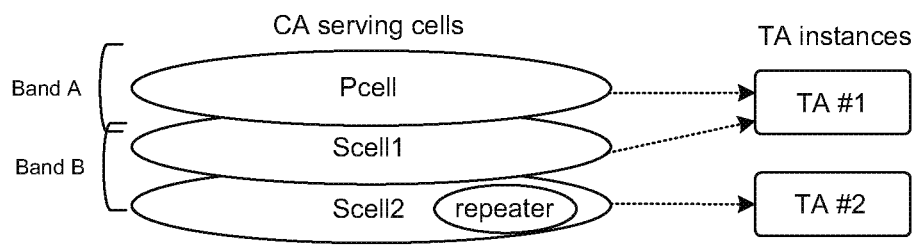

In another embodiment, a new Timing Advance (TA) index value may be designated for each TA group, as illustrated in FIG. 5b. In this example, the PCell and SCell 1 are assigned to a first TA group that is designated TA #1. The SCell 2, with its non-collocated low power node, is assigned to a separate TA group, designated TA#2. As previously discussed, the PCell can be the reference node used to identify a timing advance value for TA#1 since it includes the PCell. For the TA group designated with a TA index value of TA#2, which does not include a PCell, the UE can autonomously determine which SCell in the group is used for a downlink timing reference (i.e. which node to obtain a TA value from). While the TA index value in the example of FIG. 5b is listed as an alphanumeric value, in practice the TA index value can be a binary string, such as a two or three bit binary string used to designate the TA group.

The use of a specific TA index value to designate a TA group enables a state change of one serving cell to occur without impacting other serving cells in the same TA group. A TA index value can be used to uniquely identify a TA group when the member serving cells are configured for a TA group in a radio resource control (RRC) connection reconfiguration. The RRC signaling may be dedicated or broadcast. Each serving cell can be assigned to a particular TA group during configuration of the node associated with the serving cell based on the node's location in a cell. Thus, after configuration, the TA index value will not change for each serving cell. The TA index value can be defined in the 3GPP LTE specification, such as in Release 11 or Release 12.

Figure 6:
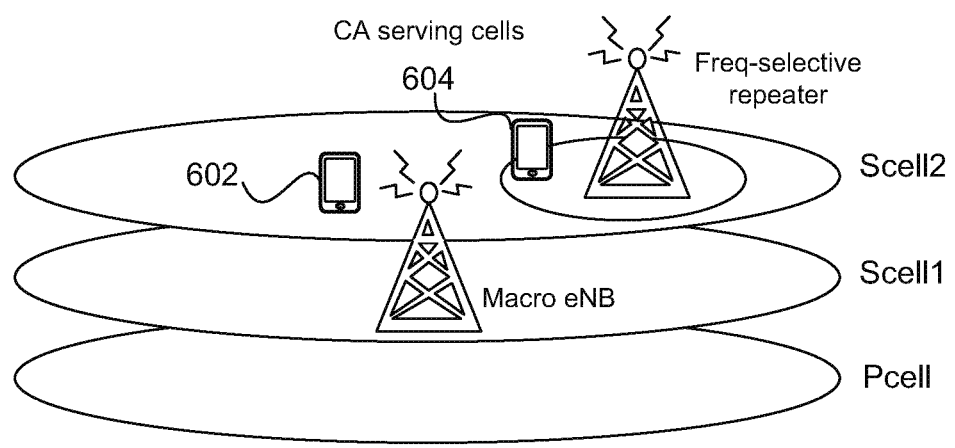
FIG. 6 is a block diagram illustrating carrier aggregation serving cells having a plurality of communication nodes to form a heterogeneous network in accordance with an example.

FIG. 6 provides another example of carrier aggregation serving cells, comprising a PCell, and first and second SCells designated as SCell 1 and SCell 2. SCell 2 includes a low power node that is illustrated as a frequency selective repeater in this example. The frequency selective repeater is used only for illustration purposes. Another type of low power node may also be used.

The actual TA value for a TA group can depend on where the UE is located within a cell. For example, when the UE is relatively close to the center of a cell, near the macro eNode B, and relatively far away from the frequency selective repeater (i.e. location 602), then the UE receives transmission on SCell 2 from the macro eNode B only. Therefore, the UE only requires a single TA value for carrier aggregation operation. However, when the UE is located near the frequency selective repeater (i.e. location 604), then the UE will receive transmissions in SCell 2 from the frequency selective repeater and the eNode B. Thus, two separate TAs can be used for carrier aggregation operations.

The eNode B may not have sufficient knowledge of UE location, prior to the activation and use of the frequency selective repeater for uplink transmission, to determine whether the frequency selective repeater should be in a different TA group. In one embodiment, measurements and signaling from the UE may be used to assist the eNode B in determining an optimized mapping of each carrier to a selected TA to allow a minimum number of TAs to be configured and maintained.

In a typical environment, a relatively small number of TAs may need to be configured and maintained. For example, a typical cell may only need between one and four different TA values based on the location of the macro eNode B and low power nodes within the cell, though this example is not intended to be limiting. Certain cell designs may implement a large number of TAs when a large number of low power nodes are geographically distributed throughout a cell.

Accordingly, in another embodiment, the eNode B can configure an SCell based on a deployment configuration. When the node associated with the SCell is deployed, the node can be assigned to a particular TA group, as previously discussed. In the example of FIG. 6, the eNode B can configure a different TA group for SCell 2 since it includes the frequency selective repeater that is disparately located relative to the eNode B. In this embodiment, the UE can always maintain two separate TA groups. At certain locations, wherein the UE is relatively equal distances from the eNode B and the frequency selective repeater, the TA values for the two separate TA groups may be about the same. In other locations, the TA values for the two separate TA groups will be different. The TA groups will be maintained independent of the value of each TA.

In the example of FIG. 6, both SCell 1 and the PCell rely on one or more eNode Bs or low power nodes that are collocated. Accordingly, SCell 1 and the PCell can be assigned to the same TA group when they are deployed. When the CA serving cells are assigned to a TA group at deployment then the mapping of serving cells to TA groups is typically not changed based on the UE's location within a cell. In other words, the TA group configuration of serving cell/carrier to TA group mapping can be eNode B specific.

When multiple TA groups are designated at deployment, each TA value can be established and maintained independently. The initialization of a new TA relies on a random access procedure, as previously discussed. In one embodiment, the initialization of a new TA may not be based on an adjustment that is relative to another previously established TA. The independence of each TA can reduce the risk of a UE communicating an unsynchronized uplink transmission to a node.

In one embodiment, a timing advance timer can be configured that is independent for each TA instance. For example, the TA #1 can be a TA instance for a first TA group that may correspond to a serving cell that includes a macro eNode B. TA #2 can be a TA instance for a second TA group that may correspond to a serving cell that includes a plurality of repeaters. The change of TA #2 can be much more significant than the change of TA #1 when the position of the UE has changed. The eNode B can be used to deploy different timing advance timers based on a selected deployment scenario. The eNode B can have full flexibility to determine which TA values should be adjusted, the time at which they are to be adjusted, the value by which the TA values will be adjusted, and the procedure that will be used to adjust the TA values. Multiple TAs can be established and maintained independently, with a separate timing advance timer used for each TA group.

The use of a specific TA index value to designate a TA group enables a state change of one serving cell to occur without impacting other serving cells in the same TA group. A TA index value can be used to uniquely identify a TA group when the member serving cells are configured for a TA group in RRC connection reconfiguration. Each serving cell can be assigned to a particular TA group during configuration of the node associated with the serving cell based on the node's location in a cell. Thus, in one embodiment the TA index value will not change for each serving cell after it is configured. The TA index value can be defined in the 3GPP LTE specification.

When only a single timing advance is used, as designated in 3GPP LTE Release 10, then a hybrid automatic retransmission request (HARQ) buffer for the PCell and SCells(s) are flushed when the timing advance timer expires. When multiple TA groups are formed, with potentially different types of CA serving cells in each group, a different technique may be used.

In one embodiment, when a timing advance timer for a TA group that is associated with a PCell expires (i.e. the TA for the PCell TA group is lost), but the timing advance timer is unexpired for a second TA group (i.e. the TA is still valid), then the HARQ buffer for SCell(s) in the second TA group can also be flushed. The HARQ buffer for the second TA group comprising only SCells may be flushed since the supporting uplink control channel for the PCell will not be available to carry the HARQ acknowledgement/negative acknowledgement (ACK/NACK) signals for the SCells. Alternatively, the HARQ buffers for the second TA group may be kept and not flushed.

In another embodiment, when the timing advance for a second TA group that is not associated with a PCell is lost (i.e. the timing advance timer expires), but the timing advance for the TA group associated with the PCell is still valid, there are three possible outcomes for the HARQ buffer for the SCells in the second TA group. First, the HARQ buffers of the second group can be flushed when the timing advance is lost. Second, the HARQ buffers of the second group may not be flushed when the timing advance is lost. And third, the HARQ buffers of both the PCell TA group and the second TA group may be flushed.

RACH Procedures for Multiple TAs

UE initiated random access channel (RACH) procedures are designated to be carried by the PCell in the 3GPP LTE Release 8/9/10 specifications. The RACH can be used by an SCell to allow for adjustments of a TA for the SCell. The need for an adjustment of a TA by an SCell is determined by an eNode B. RACH procedures are triggered through a physical downlink control channel (PDCCH) order on a scheduling cell for the uplink for which a TA adjustment is needed. Since the RACH procedure for TA adjustment in SCells is always triggered by the eNode B, and the uplink RACH transmissions are expected and directed by the eNode B, the transmissions can be configured to use designated preambles to avoid possible contention. Hence, contention based RACH consideration on an SCell is typically not necessary when there are multiple instances of timing advances. Accordingly, UE initiated RACH transmissions and contention based RACH on SCells is typically not needed to enforce multiple TA support.

In the RACH procedure, several messages are communicated between the UE and the eNode B. A first message, referred to as message (msg) 0, is a message from the eNode B to the UE asking the UE to perform an uplink transmission that starts a timing advance. A second message, msg 1, is sent from the UE to the eNode B that includes information that allows the eNode B to determine a TA adjustment, as outlined in the 3GPP LTE Rel. 8/9/10 specifications. A third message, msg 2, is sent from the eNode B to the UE that contains the amount of TA adjustment A The physical downlink control channel (PDCCH) for message (msg) 0 for an SCell can be sent on a scheduling carrier component, followed by msg 1 on the uplink of the corresponding SCell. In one embodiment, the scheduling component carrier on the SCell carrying the PDCCH for msg 0 can also be used for the PDCCH for msg 2. The SCell carrying the physical downlink shared channel (PDSCH) for msg 2 can be indicated in the corresponding physical downlink control channel.

The ability to send multiple RACH communications simultaneously may not be needed since the RACH for multiple timing advances on different SCells can be conducted on a per PDCCH order that is under the control of the eNode B. If a UE loses a timing advance on a TA group associated with a PCell as well as on a second TA group that is not associated with the PCell, the UE can first regain the TA on the PCell TA group and then try to regain the TA of the second TA group sequentially. Determining the TA values for both TA groups can be more complex and is typically not considered to be critical to meet a performance requirement. If the timing advance timers for each TA group expire independently then the need for concurrent RACH transmissions for TA adjustments can be even less likely. Accordingly, there is typically no need for multiple concurrent RACH transmissions to obtain and/or maintain multiple TAs.

Figure 7A:
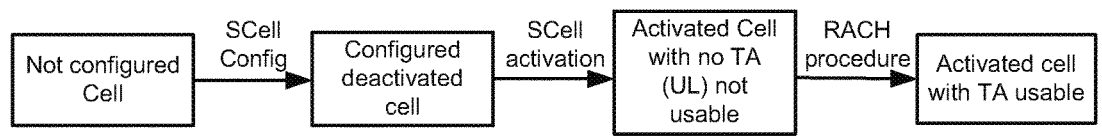
FIGS. 7a and 7b are block diagrams illustrating two examples of timing to perform a random access channel (RACH) procedure at a secondary cell (SCell) to obtain a timing advance value.

FIG. 7a provides an example of an SCell configuration procedure. In this example, the SCell is configured and then activated. The activated SCell still does not have a TA value, so no UL transmissions can be made. A PDCCH order can be used to trigger a RACH procedure to provide a TA and allow the activated cell to be used. The eNode B can assign uplink grants and the UE may start other uplink transmissions, such as the use of sounding reference signals if needed.

Figure 7B:
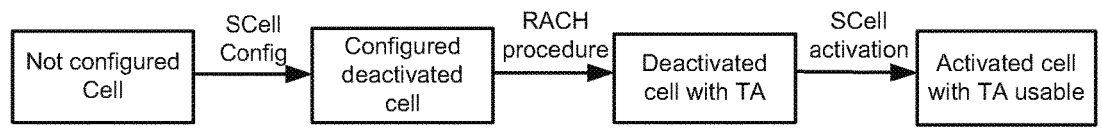

A different process is illustrated in FIG. 7b. The SCell is first configured, but not activated. A RACH procedure is then performed on the configured, deactivated cell to form a deactivated cell having a TA. The SCell is then activated to allow the SCell to be used.

In the process illustrated in FIG. 7a, the SCell is not immediately usable after activation until the RACH procedure is performed. In the process illustrated in FIG. 7b, the UE can obtain a new TA prior to activation of the SCell. This allows the SCell to be used after activation. However, the UE must maintain the carrier aggregation for a deactivated cell. This maintenance can provide an undesired amount of resources at both the UE and the eNode B. Accordingly, in one embodiment, the TA for an SCell can be adjusted using a PDCCH order following the activation of the SCell. The TA can be adjusted using a TA group index value in the MAC CE.

Figure 8:
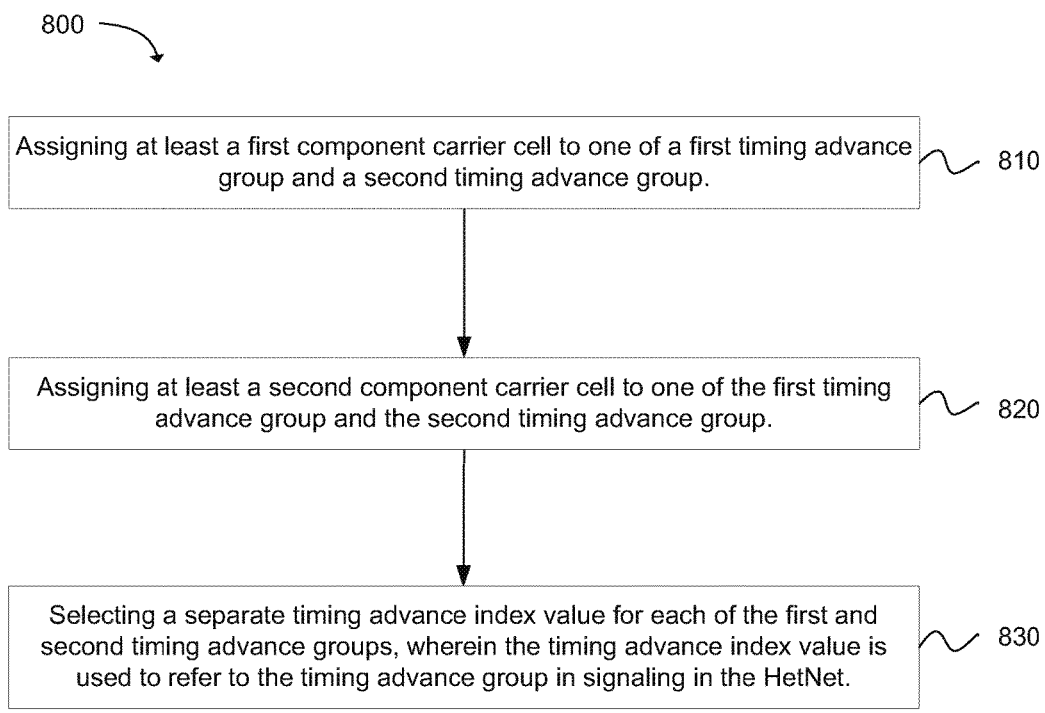
FIG. 8 is a flowchart depicting a process for forming carrier aggregation timing advance groups in a heterogeneous network (HetNet) in accordance with an example.

In another example embodiment, the flow chart of FIG. 8 depicts a method 800 for forming carrier aggregation timing advance groups in a heterogeneous network (HetNet). The method comprises assigning 810 at least a first component carrier cell to one of a first timing advance group and a second timing advance group. An additional step involves assigning 820 at least a second component carrier cell to one of the first timing advance group and the second timing advance group. A separate timing advance index value is selected 830 for each of the first and second timing advance groups. The timing advance index value is used to refer to the timing advance group in signaling in the HetNet.

The method 800 of FIG. 8 can further comprise assigning a component carrier cell that is a PCell to the first timing advance group and using the PCell to obtain a timing advance value from a base station for the first timing advance group. The step of assigning the at least second component carrier cell can further comprise assigning at least one component carrier cell that is a secondary cell (SCell) to the second timing advance group, and selecting one of the at least one SCells to obtain a timing advance value from a base station for the second timing advance group.

Each of the at least first and the at least second component carrier cells can be assigned to one of the first and second timing advance groups based on a geographic location of each of the at least first and the at least second component carrier cells relative to one another, wherein component carrier cells located within a selected distance of each other are assigned to a same timing advance group. A separate timing advance timer can be maintained for each timing advance group.

In one embodiment, a HARQ buffer of the first timing advance group and the second timing advance group can be flushed when a timing advance is lost for a timing advance group associated with the PCell.

A scheduled time can be assigned for the SCell to perform a RACH procedure to obtain a timing advance value from a base station in the HetNet for one of the first and second timing advance groups. Due to the scheduled time, the RACH procedure with the base station is not contention based.

As previously discussed, the RACH procedure to obtain a timing advance value from the base station includes sending multiple messages between a base station and a mobile device. These messages are commonly referred to as message 0, 1 and 2. The component carrier cell that is configured to carry a physical downlink control channel (PDCCH) for message 0 can also be assigned to carry message 2. A timing advance value for the first timing advance group can be obtained at a non-concurrent time than a timing advance value is obtained for the second timing advance group.

In one embodiment, a timing advance value for one of the first and the second component carrier cells that is designated as an SCell in the HetNet can be adjusted using an order carried on a physical downlink control channel after an activation of the SCell using the timing advance index value for the SCell's timing advance group that is located in a Medium Access Control (MAC) Control Element.

In another embodiment, an eNode B that is operable in a wireless network and adapted for forming carrier aggregation timing advance groups in a HetNet is disclosed. The eNode B, such as the Macro eNode B depicted in FIG. 6, is configured to activate, at the eNode B, a component carrier that is an SCell for a mobile device. The eNode B is further configured to determine, at the eNode B, if the SCell is in a different timing advance group than a primary cell (PCell) for the mobile device based on a predetermined timing advance index value received from the mobile device for the SCell. Alternatively, the SCell may be determined to be in a different timing advance group than the PCell based on a deployment of a transmission station associated with the SCell. The SCell can be correlated to a new or existing timing advance group using a timing advance group index. The eNode B can send an order on a physical downlink control channel to the mobile device on the SCell for which the timing advance adjustment is needed when the SCell's timing advance index value is different than a timing advance index value for the PCell. The eNode B can send the order to the SCell after the SCell is activated, as previously discussed. The order can be sent using the timing advance index value for the SCell's timing advance group that is located in a Medium Access Control (MAC) Control Element. The eNode B can maintain a separate timing advance timer for each timing advance group.

Figure 9:
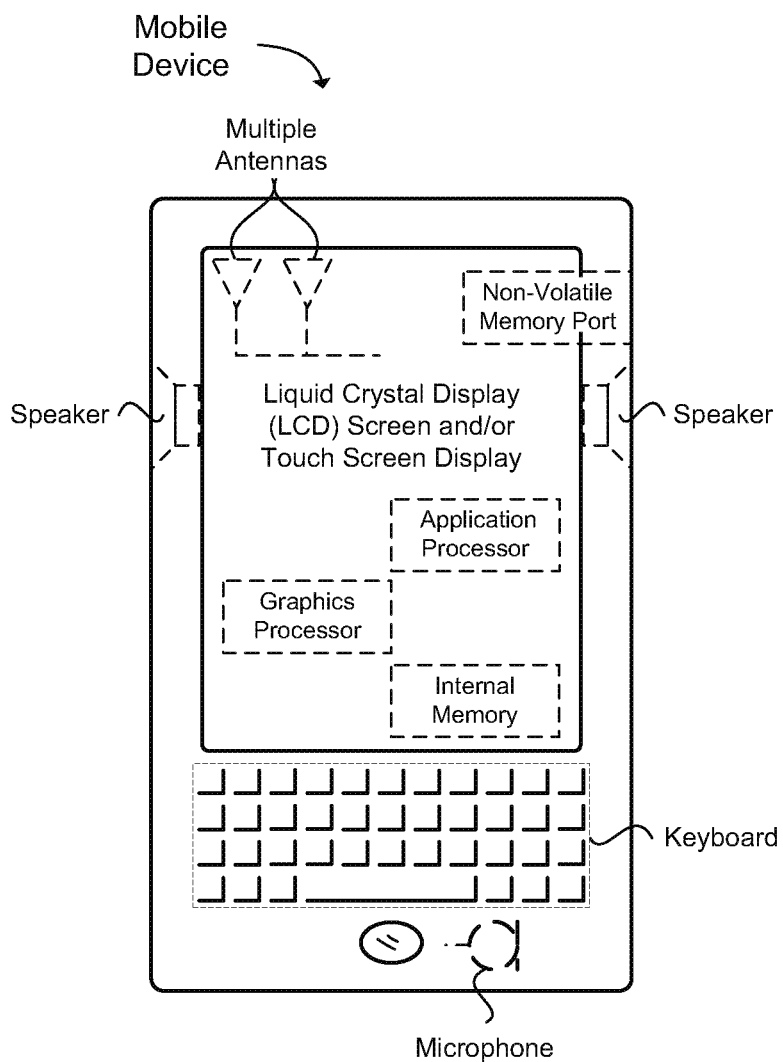
FIG. 9 illustrates a block diagram of a mobile communication device in accordance with an example.

FIG. 9 provides an example illustration of a mobile device, such as a user equipment (UE), a mobile station (MS), a mobile wireless device, a mobile communication device, a tablet, a handset, or other type of mobile wireless device. The mobile device can include one or more antennas configured to communicate with a base station (BS), an evolved Node B (eNB), or other type of wireless wide area network (WWAN) access point. While two antennas are shown, the mobile device may have between one and four or more antennas. The mobile device can be configured to communicate using at least one wireless communication standard including Third Generation Partnership Project Long Term Evolution (3GPP LTE), Worldwide interoperability for Microwave Access (WiMAX), High Speed Packet Access (HSPA), Bluetooth, WiFi, or other wireless standards. The mobile device can communicate using separate antennas for each wireless communication standard or shared antennas for multiple wireless communication standards. The mobile device can communicate in a wireless local area network (WLAN), a wireless personal area network (WPAN), and/or a wireless wide area network (WWAN).

FIG. 9 also provides an illustration of a microphone and one or more speakers that can be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Various techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for forming carrier aggregation timing advance groups in a heterogeneous network (HetNet), comprising:
   assigning, using one or more processors and memory, at least a first component carrier cell to one of a first timing advance group and a second timing advance group;
   assigning, using one or more processors and memory, at least a second component carrier cell to one of the first timing advance group and the second timing advance group;
   selecting, using one or more processors and memory, a separate timing advance index value for each of the first and second timing advance groups, wherein the timing advance index value is used to refer to the timing advance group in signaling in the HetNet; and
   flushing, using one or more processors and memory, a hybrid automatic retransmission request (HARQ) buffers of the first timing advance group and the second timing advance group when a timing advance is lost for a timing advance group associated with a primary cell (PCell).

2. The method of claim 1, further comprising:
   wherein assigning the at least first component carrier cell further comprises assigning a component carrier cell that is a primary cell (PCell) to the first timing advance group; and
   using the PCell to obtain a timing advance value from a base station for the first timing advance group.

3. The method of claim 1, further comprising:
   wherein assigning the at least second component carrier cell further comprises assigning at least one component carrier cell that is a secondary cell (SCell) to the second timing advance group; and
   selecting one of the at least one SCells to obtain a timing advance value from a base station for the second timing advance group.

4. The method of claim 1, further comprising assigning each of the at least first and the at least second component carrier cells to one of the first and second timing advance groups based on a geographic location of each of the at least first and the at least second component carrier cells relative to one another, wherein component carrier cells located within a selected distance of each other are assigned to a same timing advance group.

5. The method of claim 1, further comprising maintaining a separate timing advance timer for each timing advance group.

6. The method of claim 1, further comprising assigning a scheduled time for a secondary cell (SCell) to perform a random access channel (RACH) procure to obtain a timing advance value from a base station in the HetNet for one of the first and second timing advance groups, wherein the RACH procedure with the base station is not contention based.

7. The method of claim 1, further comprising assigning the component carrier cell configured to carry a physical downlink control channel (PDCCH) for a message 0 to also carry a message 2, wherein message 0 and message 2 are messages in a random access channel (RACH) procedure to obtain a timing advance value from a base station.

8. The method of claim 1, further comprising obtaining a timing advance value for the first timing advance group at a non-concurrent time as a timing advance value is obtained for the second timing advance group.

9. The method of claim 1, wherein a timing advance value for one of the first and the second component carrier cells that is designated as a secondary cell (SCell) in the HetNet is adjusted using an order carried on a physical downlink control channel after an activation of the SCell using the timing advance index value for the SCell's timing advance group that is located in a Medium Access Control (MAC) Control Element.

10. A computer program product, comprising a non-transitory computer readable storage medium having a computer readable program code embodied therein, the computer readable program code adapted to be executed to implement a method for forming carrier aggregation timing advance groups in a heterogeneous network (HetNet), comprising:
assigning, using one or more processors and memory, at least a first component carrier cell that includes a primary cell (PCell) to a first timing advance group;
assigning, using one or more processors and memory, at least a second component carrier cell that includes a secondary cell (SCell) to one of the first timing advance group and a second timing advance group;
defining, using one or more processors and memory, a separate timing advance index value for each of the first and second timing advance groups, wherein the timing advance index value is used to refer to the timing advance group in signaling in the HetNet; and
assigning, using one or more processors and memory, a scheduled time for the SCell to perform a random access channel (RACH) procedure to obtain a timing advance value from a base station in the HetNet for one of the first and second timing advance groups, wherein the RACH procedure with the base station is not contention based.

11. The computer program product of claim 10, further comprising using the PCell to obtain a timing advance value from a base station in the HetNet for the first timing advance group.

12. The computer program product of claim 10, further comprising selecting one of the at least one SCells to obtain a timing advance value from a base station for the second timing advance group.

13. The computer program product of claim 10, further comprising selecting an active SCell in the second timing advance group to obtain a timing advance value from a base station in the HetNet for the second timing advance group, wherein the active SCell is selected based on at least one of an SCell having a highest cell index value, an SCell having a lowest cell index value, a first configured SCell in the second timing advance group, and a last configured SCell in the second timing advance group.

14. The computer program product of claim 10, further comprising assigning each of a plurality of component carrier cells to one of the first and second timing advance groups based on a geographic location of each of the component carrier cells relative to one another, wherein component carrier cells located within a selected distance of each other are assigned to a same timing advance group.

15. The computer program product of claim 10, further comprising maintaining a separate timing advance timer for each timing advance group.

16. The computer program product of claim 10, further comprising flushing hybrid automatic retransmission request (HARQ) buffers of the first timing advance group and the second timing advance group when a timing advance is lost for a timing advance group associated with a primary cell (PCell).

17. An apparatus of an enhanced Node B (eNode B) operable in a wireless network and adapted for forming carrier aggregation timing advance groups in a heterogeneous network (HetNet), wherein the apparatus is comprises one or more processors and memory configured to:
activate, at the eNode B a component carrier, that is a secondary cell (SCell) for a mobile device;
determine, at the eNode B if the SCell is in a different timing advance group than a primary cell (PCell) for the mobile device based on a deployment of a transmission station associated with the SCell;
correlate the SCell to a new or existing timing advance group using a timing advance group index;
send an order on a downlink control channel to the mobile device on the SCell based on the SCell's timing advance group index; and
assign a scheduled time for the SCell to perform a random access channel (RACH) procedure to obtain a timing advance value from a base station in the HetNet for one of the new or existing timing advance groups, wherein the RACH procedure with the base station is not contention based.

18. The apparatus of claim 17, wherein the order is sent on the downlink control channel to the mobile device on the SCell for timing advance adjustment associated with the SCell's timing advance group index when the SCell's timing advance value is unknown and may be different than a timing advance value for the PCell or other previously uplink synchronized SCells.

19. The apparatus of claim 17, wherein the order is sent to the SCell after the SCell is activated.

20. The apparatus of claim 17, wherein eNode B is further configured to maintain a separate timing advance timer for each timing advance group.

21. The apparatus of claim 17, wherein the order is sent using the timing advance index value for the SCell's timing advance group that is located in a Medium Access Control (MAC) Control Element.

22. The apparatus of claim 17, wherein the eNode B is configured to communicate with a mobile device, wherein the mobile device includes an antenna, a touch sensitive display screen, a speaker, a microphone, a graphics processor, an application processor, internal memory, a non-volatile memory port, and combinations thereof.

* * * * *